United States Patent [19]

Chatelain

[11] Patent Number: 5,762,474

[45] Date of Patent: Jun. 9, 1998

[54] VARIABLE-PITCH PROPELLER ASSEMBLY ENABLING PITCH REVERSAL DURING OPERATION

[76] Inventor: Michel Chatelain, 10 Rue Du Ramponnet, F-74940, Annecy Le Vieux, France

[21] Appl. No.: 698,101

[22] Filed: Aug. 15, 1996

[51] Int. Cl.⁶ ............... B63H 3/04; F01D 7/00; F03B 3/14

[52] U.S. Cl. ............ 416/150; 416/157 R; 416/157 B; 416/161; 416/166

[58] Field of Search .............. 416/150, 151, 416/157 R, 157 B, 161, 64, 166, 219 A, 220 A; 440/50

[56] References Cited

U.S. PATENT DOCUMENTS

| | | | |
|---|---|---|---|
| 0,612,598 | 10/1898 | Wanless | 416/220 A |
| 1,606,029 | 11/1926 | Herr | 416/220 R |
| 3,288,228 | 11/1966 | Irgens | 416/166 |
| 3,331,446 | 7/1967 | Feroy | 416/164 |
| 4,090,812 | 5/1978 | Moran | 416/150 |
| 4,474,533 | 10/1984 | Hino | 416/157 R |
| 5,090,869 | 2/1992 | Wright | 416/157 B |

FOREIGN PATENT DOCUMENTS

| | | | |
|---|---|---|---|
| 0191690 | 11/1983 | Japan | 416/157 R |
| 0228268 | 11/1943 | Sweden | 416/157 B |

*Primary Examiner*—Christopher Verdier
*Attorney, Agent, or Firm*—William A. Drucker

[57] ABSTRACT

A propeller unit, each blade (1) being fixed to a blade foot (2) rendered integral with a hub (3) rotating around an axis but mobile with respect to the hub on translation in the direction of the axis and rotating around a second axis orthogonal to the first axis, this foot (2) being moreover rendered integral with an arch (5) in translation but free with respect to the arch on rotation; a pitch modifier is linked to the arch to translate the arch along the spin axis of the hub (3); the hub (3) and each blade foot (2) have members (8, 23) for activating the feet in rotation provoking from translation of the arch (5) the rotation of the blade feet around an axis mobile on translation in the same direction and orthogonal to the blade feet.

9 Claims, 2 Drawing Sheets

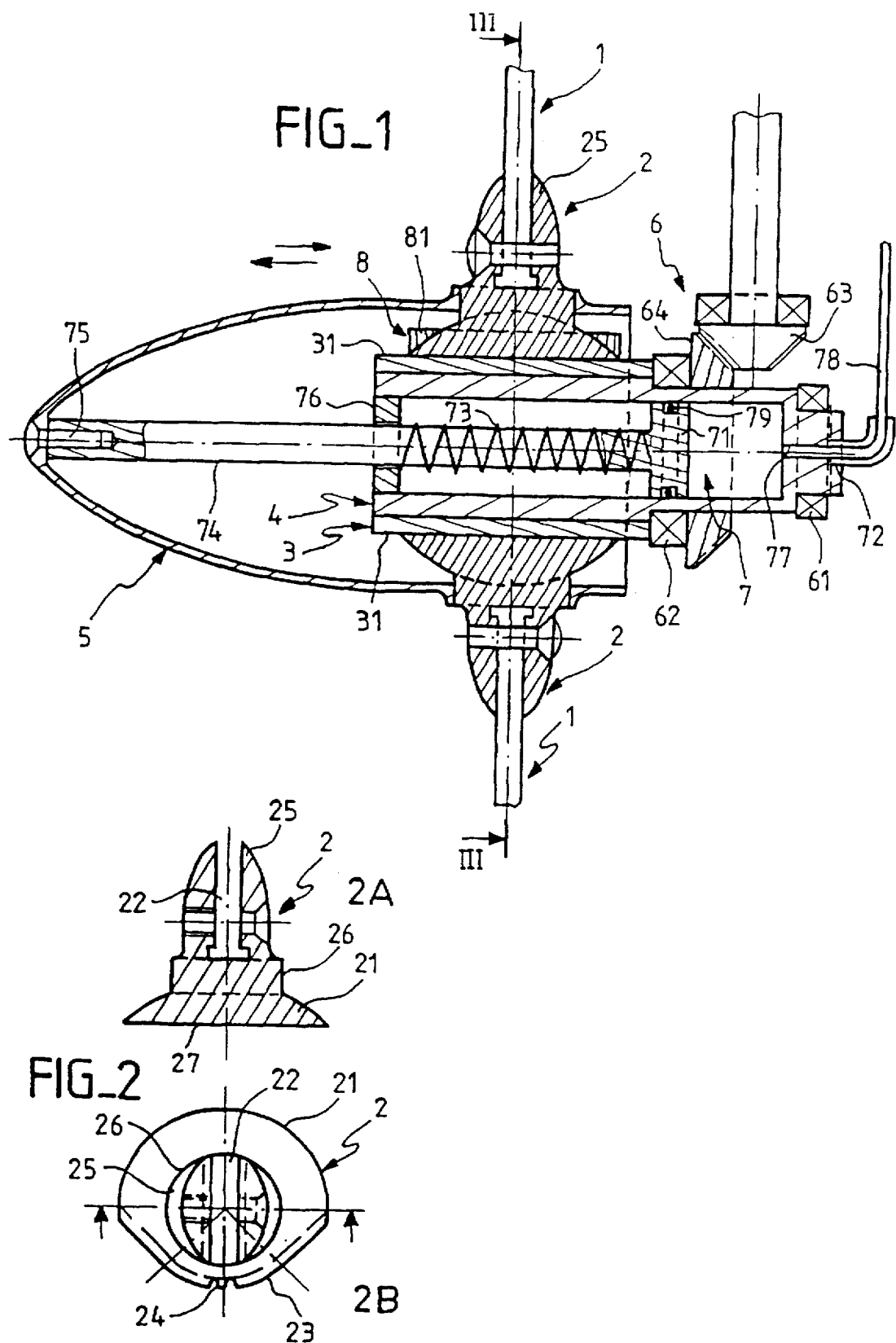

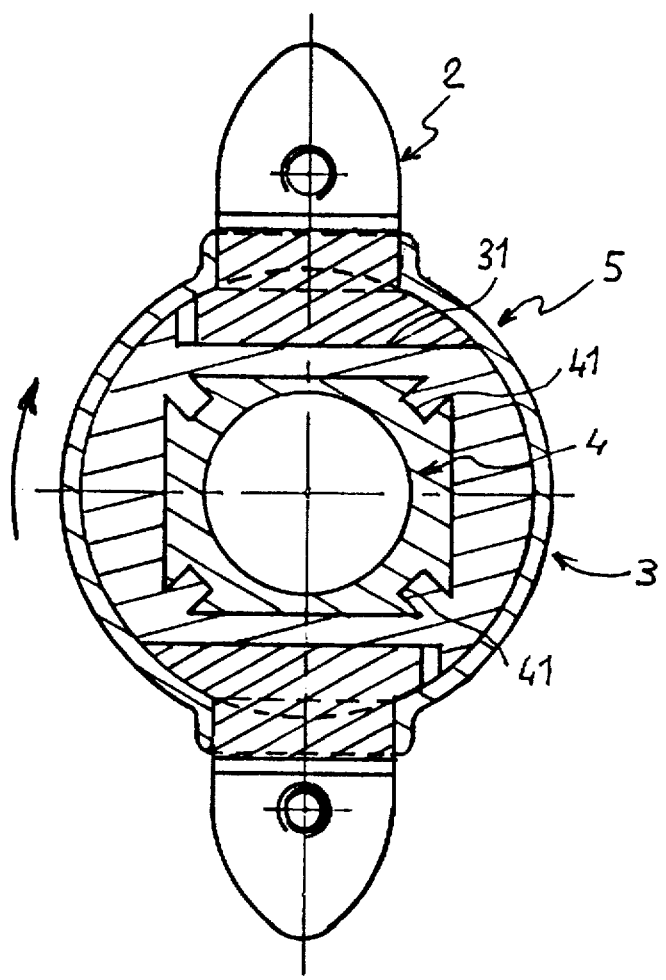
FIG_3

VARIABLE-PITCH PROPELLER ASSEMBLY ENABLING PITCH REVERSAL DURING OPERATION

FIELD OF THE INVENTION

The invention concerns a variable pitch propeller unit intended in particular to the propulsion of transport engines, as well as the activation of windmill devices, such as windmill pumps or even turbines in hydroelectric power stations and the like.

BACKGROUND OF THE INVENTION

Known types of variable pitch propellers comprise blades moving rotating around a fixed axis in the hub of the propeller. This axis is rotary-controlled by a pinion unit which is frequently complex and heavy occupying a large amount of space and accordingly expensive to produce.

SUMMARY OF THE INVENTION

The object of the invention is to resolve this drawback by creating a variable pitch propeller associated with an activation device so as to constitute a unit of simple construction and being relatively light so as to limit production costs to a reasonable figure. In cases where repair is required, the invention also aims to facilitate breakdown operations enabling the damaged blade(s) to be replaced easily and quickly.

To this effect, the invention concerns a variable pitch propeller of the type comprising blades rendered integral with a rotary hub mounted around an axis and housed in an arch, wherein:

each blade is fixed to a blade foot which is firstly rendered integral with the hub in its rotation around the axis but free with respect to the latter, both in translation in the direction defined by this axis and in rotation around an axis orthogonal to the latter, and secondly rendered integral with the arch in translation but free with respect to it on rotation, means for modifying the pitch of the propeller are mechanically linked to the arch so as to selectively drive it in a translation movement with respect to the hub along the spin axis of the latter, and the hub and each blade foot comprise members for activating the blade feet in rotation provoking from translation of the arch the rotation of the blade feet around an axis mobile in translation in the same direction and orthogonal to the latter.

By means of these characteristics, a propeller unit with easily interchangeable blades is obtained and whose pitch can be modified and rendered reversible during operation.

BRIEF DESCRIPTION OF THE DRAWINGS

Other characteristics and advantages of the invention shall appear more readily from the following description of an embodiment of the invention, said embodiment being given by way of non-restrictive example and shown on the attached drawings in which:

FIG. 1 is a longitudinal diagrammatic profile cutaway view of a propeller unit conforming to the invention, FIGS. 2A and B are views showing in more detail a part of the unit of FIG. 1, respectively a profile section and a top view, and FIG. 3 is a transverse cutaway view along the line III—III of FIG. 1 of a portion of the unit of FIG. 1.

DETAILED DESCRIPTION OF THE PREFERRED EMBODIMENTS

The propeller unit shown in the figures, namely a twin-blade propeller, is provided so as to be coupled to a boat outboard engine.

This propeller unit comprises two blades 1 each fixed to a respective blade foot 2 rendered integral with a hub 3 borne by an elongated shaft 4 centered on an axis and rotating around this axis driving the blades which are mounted aligned in opposing directions and defining when rotating a plane perpendicular to the spin axis of the shaft. The bases of the blade feet 2 rendered integral with the hub 3 and the hub and a portion of the shaft 4 are housed in an arch 5 having a form of revolution with circular straight sections centered on the spin axis internally cylindrical around the hub. The shaft 4 is driven in rotation by a drive device 6 possibly having pinions, a belt or belts or similar elements.

According to the invention, the shaft 4 is hollow and associated with means 7 for modifying the pitch of the propeller acting on the orientation of the blades 2 by means of translations in an axial direction of the arch 5 with which the bases 21 of the blade feet are integral, said bases 21 being translation-linked but free in rotation with respect to the arch, the translation movement of the blade feet due to that of the arch provoking a rotation of the blade feet via the cooperation of each blade foot base 21 with a rack 8 fixed to the hub. The means 7 for modifying the pitch of the propeller are hydraulic means. To this effect, the hollow shaft 4, embodied in the way of a jack, contains a sliding piston 71 moved by a fluid introduced axially into the hollow shaft and removed from the latter by means of a rotating joint 72 and subsequently (as shall be seen subsequently) by an elastic recall element 73, and a rod 74, borne by the piston and partially extending axially into the hollow shaft, is fixed at the top of the arch 5.

More specifically, the blades 1 made of a moderately priced synthetic material are fixed into the metallic blade feet 2 in a groove extending longitudinally in the same direction as the plane of rotation of the blades. Like the corresponding portion of the blades, this groove has a transverse T-shaped section whose vertical branch extends in the same direction as the blade and whose horizontal bar extends in the same direction as the spin axis of the propeller. Fixing is effected by a screw traversing the thickness of the blade. The blades have a lesser resistance safety rupture zone so that they break in this zone if an impact occurs with a force or torque exceeding a predetermined value.

The base 21 of the blade feet has the general outer shape of a truncated spherical skull-cap whose role shall be seen later. However, this truncated spherical skull-cap has a tooth 23 on a truncated lateral arc of a circle zone extended laterally by tangents rejoining the contour of the base of the spherical skull-cap, along which teeth 24 are formed and succeed each other extending in the same direction as the blades and intended to gear turn by turn with the teeth 81 of the rack 8 which also extend in the same direction as the blades 1 and follow one another in the same direction as the spin axis of the propeller. The truncated spherical skull-cap region of the base 21 of the blade feet is connected to the fixing region 25 of the blades by a cylindrical region 26 whose central axis prolongs the line of the skull-cap which is perpendicular to the lower flat face 27 of the base of the latter. The injected synthetic hub 3 is molded around the shaft 4, which is preferably metallic and preferably steel. It outwardly has a general cylindrical shape centered on the spin axis of the propeller with an outer diameter almost equal to the internal diameter of the cylindrical portion of the arch surrounding it fitted with diametrically opposing flat pieces on which the lower flat faces 27 of the bases of the blade feet are laid. The racks 8 can be secured to these pieces 31, or be made up of a single element with the hubs, depending on the materials used; in this second case, the flat pieces do not extend transversally to the hubs over the entire extent of the latter, but are on one side limited by a wall perpendicular to them and extending in a general longitudinal direction, said wall being fitted with teeth having a shape identical to those of the base of the blade feet so as to gear with them and extending perpendicular to the flat piece by following each other longitudinally.

The arch 5 is fixed to the rod 74 borne by the piston 71 to its top by means of a screw 75. It comprises in its lateral wall two circular holes whose central axes are aligned and diametrically opposing allowing passage to the cylindrical region 26 of the blade feet 2 whose blade fixing region 25 is outside the arch. The lateral wall of these circular holes is used as a support area for this cylindrical region 26 of the blade feet when the arch, activated by the piston rod 74, slides around the hub 3, thus driving the blade feet which simultaneously rotate in the circular holes of the arch on account of the gearing of their teeth 24 with the teeth 81 of the racks 8. So as to suitable guidance at the base of the blade feet at the time it rotates in the arch, without any play prejudicial to functioning, the line of the spherical surface of the base 21 is scarcely smaller than that of the right section of the arch which contains the central axes of the circular holes. Furthermore, this shape ensures a good distribution of the stresses. The hollow shaft 4 outwardly has in the right cross section a general rectangular shape which is married by the inner wall of the hub 3 molded around it. The angles of the parallelepiped formed by the outer wall of the shaft are fitted with longitudinal grooves 41. The central cavity of the hollow shaft in which the piston 71 moves has a circular right cross section. This central cavity is sealed off at its extremity on the side of the top of the arch 5 by a guiding disk 76 of the piston rod 74 provided with a central hole for the passage of this rod 74 and only opens at its opposing extremity by a pipe 77 for passage of the fluid for controlling modification of the pitch of the propeller and a housing for the rotating joint 72 traversed by the fluid intake tube 78, such as a Rilsan® pipe. The piston 71 mounted sliding inside the bore of the hollow shaft is sealed by means of a lining housed in a throat hollowed out in the circumference of the piston. The elastic element 73 in the form of a helical spring wound around the piston rod in support at an extremity against the guiding disk 76 of the piston rod and at the opposing extremity against the piston 71 enables the latter to be brought back to the extremity of the hollow shaft by which the control fluid is brought. Of course, another elastic element can be used for the same purpose and the hollow shaft can be embodied as a twin-effect jack making it possible to suppress an element, such as a spring. The piston 71 is made of a synthetic material and the rod 74 can be embodied with it in a monoblock form.

The hollow shaft 4 outwardly has a certain number of shoulders against which disposed are stops and/or ball bearings 61, 62 used for its support in a bearing (close to its extremity by which the passage fluid is introduced) and at the time of transmission of the rotation movement to the propeller, said movement being transmitted from a motor device (not shown on the drawings) with the aid of conical gearing pinions 63, 64.

If reference is made to FIG. 1, it can be easily seen that the rotation of the pinions 63, 64 of the drive device 6 provokes a corresponding rotation of the hollow shaft 4 with the hub 3 and its racks 8 and accordingly firstly the pitch modification means 7 linked to the hollow shaft, and secondly the feet of the blades 2 and blades 1 and of the arch 5. If it is desired to modify the pitch of the propeller, by maneuvering a control device (not shown) comprising a single jack with an automatic or manual control screw or other element, it merely suffices to introduce the desired quantity of control fluid (oil, for example) under an appropriate pressure by means of the tube 78 and through the rotating joint 72 into the bore of the hollow shaft so as to provoke a translation of the piston 71 which receives the hydraulic thrust. The translation of the piston 71 against the recall force exerted by the spring 73 drives the translation of the arch 5 by means of the rod 74 and thus a movement of the blade feet 2 in the direction of the spin axis of the propeller. On moving, the blade feet 2 roll in support against the racks 8 on account of the reaction of the teeth 81 of the latter on the teeth 24 of the toothing 23 of the base regions 21 of the blade feet, said teeth again being fully geared without any play. The rotation of the blade feet when they move longitudinally naturally provokes an identical movement of the blades and thus modification of the pitch of the propeller. In other words, the modification of the pitch of the propeller is accompanied by a change of the location of the longitudinal axis of the blades along the spin axis of the propeller. As already seen, a modification in the opposite direction is obtained by the recall force exerted on the piston when the fluid quantity and pressure reduce in the hollow shaft or even by using a twin-effect jack instead of a single effect jack. In any event, the pitch of the propeller can be modified and even inverted during operation, that is at the time of rotation of the propeller around its axis continuously by passing accurately through the dead point without jerking. With this propeller unit, the propeller can also be held as a non-rotating flag so as to reduce drag.

Moreover, by means of this disposition, the blades are easy to produce with a low cost price and are easily rapidly interchangeable. The rupture of the blades can therefor be admitted as normal in a region of less resistance provided to this effect should an impact occur during rotation, no costly repair being required as it merely suffices to change the broken blades, an operation which is rendered extremely simple and fast by virtue of the T-shaped groove of the blade feet facilitating their positioning and fixing by a single screw. On the other hand, the rest of the propeller has not deteriorated. This results in having increased safety at a lower price and the propeller can be used on traction, that is on direct attack, which makes it possible to obtain improved efficiency.

Finally, the fact that this disposition makes use of a maximum number of injected synthetic elements is a second source for reducing production costs permitting a series production makes it possible to obtain a satisfactory aesthetic aspect (color obtained from the block) and a particularly favorable finishing quality in terms of penetrating into the medium, such as into water, and also results in obtaining a light unit compared with the weight of other variable pitch propeller units.

Of course, the invention is not limited to the embodiment shown and described above and others could be provided without departing from the context of the invention, especially propeller units comprising any number of blades naturally associated with the appropriate number of racks. In accordance with the invention, it is possible to also produce propellers comprising several sets of blades disposed behind one another, this being the case with stepped pumps, the blades of each set being fixed with a different angle. Pitch modification is applied simultaneously to the blade sets by retaining the same angular shift. In this case, the arch, which has accordingly been extended, merely needs to be pierced with a number of rows of holes extending circumferentially for the passage of the blade feet, this number corresponding to the number of blades, and naturally the elements it contains, especially the hub, are longer if required. It is also proper to note that if the shown and described embodiment is a propeller unit where the shaft is activated in rotation by a device acting on the latter via the outside (pinion, belt, etc), it is also possible to provide embodiments where the shaft is directly connected to the motor, the joint being disposed at the periphery of the shaft. For example, the rotating joint is formed of two sealing rings between which the control fluid is introduced, and a radial hole extending onto the axis between these two rings is used for introduction of the fluid into the hollow shaft in which the piston slides.

What is claimed is:

1. A variable pitch propeller unit which comprises:

(a) blades each provided with a blade foot, (b) a hub mounted rotating around an axis and housed in an arch, said blade foot being integral with the hub in its rotation around said axis being free with respect to said hub upon translation in the direction defined by said axis and being free with respect to said hub upon rotation around an axis orthogonal to said axis, and said blade foot being integral with said arch upon translation in said direction defined by said axis and being free with respect to said arch upon rotation about said hub axis, (c) means for modifying the pitch of said blades, said means being mechanically linked to said arch to selectively drive said arch in its translation movement with respect to said hub along said hub axis, and (d) members for activating the foot of each said blade in said rotation about said hub axis for causing the translation of said arch, said arch translation causing the rotation of the foot of each said blade around said axis which is orthogonal to said hub axis.

2. The propeller unit according to claim 1 wherein each said respective blade and each said respective blade foot are interconnected by T-shaped portions traversed by a screw.

3. The propeller unit according to claim 1 wherein each blade foot and the hub are disposed one against the other by respective opposite flat faces.

4. The propeller unit according to claim 1 wherein the blade foot comprises a cylindrical region mounted free in rotation in a circular hole of the arch, and a spherical cap shaped region extended between the hub and an inner face of a wall of the arch, the members for activating the rotating blade foot from said translation of the arch being respectively borne by the hub and the blade foot.

5. The propeller unit according to claim 1 wherein the hub is fixed around a hollow shaft and the means for modifying the pitch of the propeller include a piston mounted slidingly in this hollow shaft and moved by a fluid, an axial rod borne by this piston and fixed to the top of the arch and a rotating joint housed in one extremity of the hollow shaft.

6. The propeller unit according to claim 1 wherein the members for activating the rotating blade foot include for each blade a rack borne by the hub and tooth extending onto one portion of the periphery of a base of the blade foot.

7. The propeller unit according to claim 1 wherein the means for modifying the pitch of the propeller include a recall element in support against a piston mounted slidingly under the action of a fluid in a hollow shaft partially housed in the hub.

8. The propeller unit according to claim 1 comprising several blades evenly distributed around the hub.

9. The propeller unit according to claim 5 wherein the rotating joint is disposed around the hollow shaft.

* * * * *